No. 12,615. REISSUED MAR. 12, 1907.
W. R. MULOCK.
RAILWAY FREIGHT CAR.
APPLICATION FILED JAN. 30, 1907.
4 SHEETS—SHEET 1.
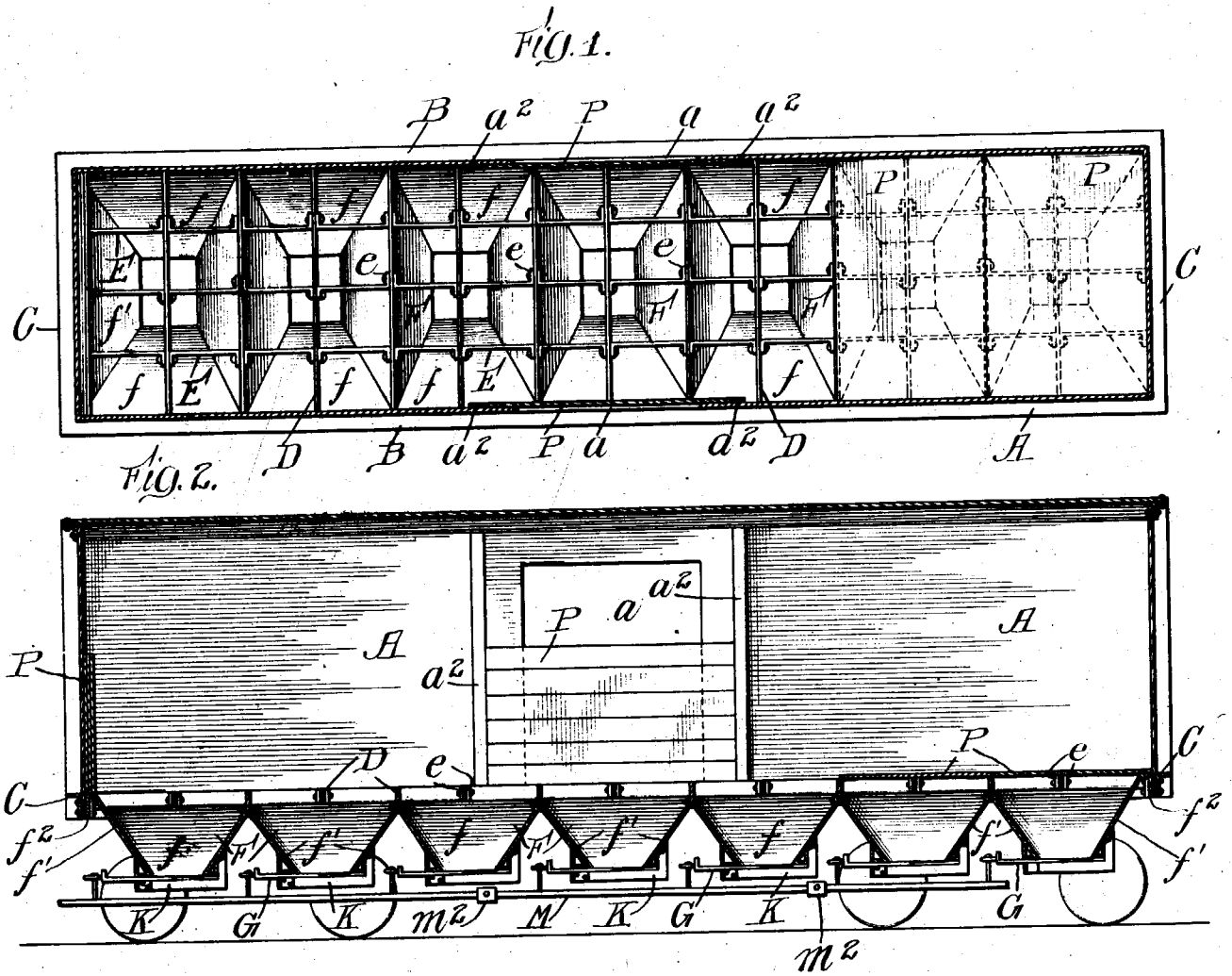
Witnesses:
Lillian Prentice
Katharine Sulach
Inventor:
William Redford Mulock
by Pierce & Fisher
Attorneys.

No. 12,615. REISSUED MAR. 12, 1907.

W. R. MULOCK.

RAILWAY FREIGHT CAR.

APPLICATION FILED JAN. 30, 1907.

4 SHEETS—SHEET 2.

Witnesses:
Lillian Prentice
Katharine Sulach

Inventor:
William Redford Mulock
By Pierce & Fisher
Attorneys.

No. 12,615. REISSUED MAR. 12, 1907.

W. R. MULOCK.

RAILWAY FREIGHT CAR.

APPLICATION FILED JAN. 30, 1907.

4 SHEETS—SHEET 3.

Witnesses:

Lillian Prentice

Katharine Gulach

Inventor:

William Redfud Mulock

By Peirce & Fisher

Attorneys.

No. 12,615. REISSUED MAR. 12, 1907

W. R. MULOCK.

RAILWAY FREIGHT CAR.

APPLICATION FILED JAN. 30, 1907.

4 SHEETS—SHEET 4.

Witnesses:

Lillian Prentice

Katharine Deilach

Inventor:

William Redford Mulock

By Pierce & Fisher

Attorneys.

UNITED STATES PATENT OFFICE.

WILLIAM REDFORD MULOCK, OF WINNIPEG, MANITOBA, CANADA.

RAILWAY FREIGHT-CAR.

No. 12,615. Specification of Reissued Letters Patent. Reissued Mar. 12, 1907.

Original No. 820,240, dated May 8, 1906. Application for reissue filed January 30, 1907. Serial No. 354,947.

*To all whom it may concern:*

Be it known that I, WILLIAM REDFORD MULOCK, a citizen of the Dominion of Canada, residing at Winnipeg, in the Province of Manitoba, Dominion of Canada, have invented certain new and useful Improvements in Railway Freight-Cars, of which I do declare the following to be a full, clear, and exact description, reference being had to the accompanying drawings, forming part of this specification.

The present invention has for its object to provide an improved construction of freight-car that shall be capable of carrying grain, coal, ore, or other merchandise in bulk in such manner that such bulk merchandise may be automatically discharged by gravitation, my improved car being also adapted for carrying ordinary or package merchandise by the employment of a removable flooring upon a skeleton network or floor-support at the bottom of the car-body. This object of my invention is fully accomplished by the improvements in construction hereinafter described, illustrated in the accompanying drawings, and particularly pointed out in the several claims at the end of this specification, and the many advantages incident to the invention will be readily understood by those familiar with the construction and operation of railway freight-cars.

Figure 3:
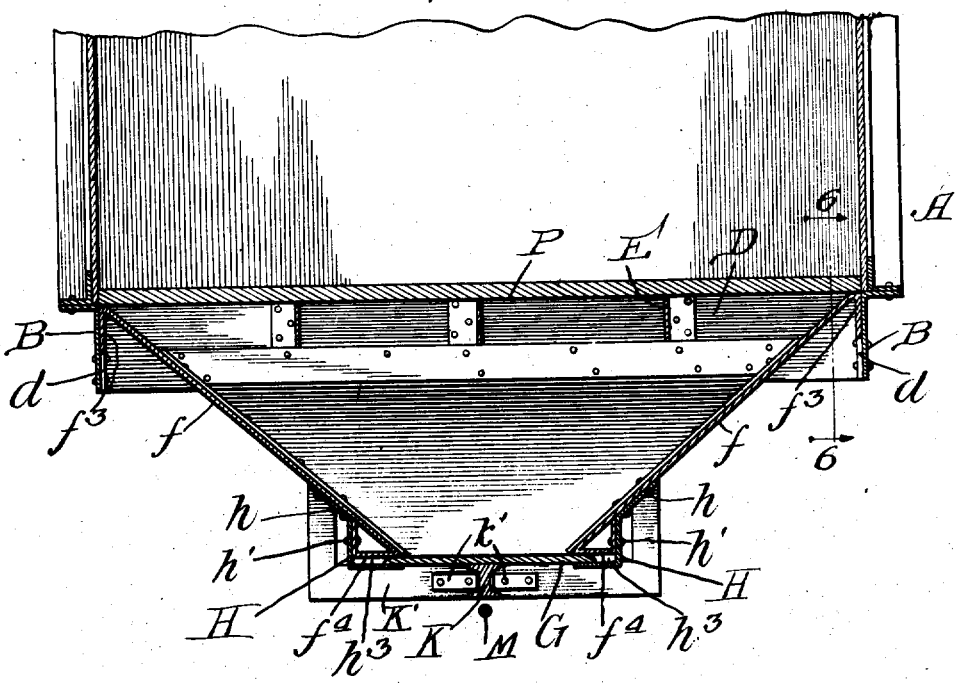
Figure 4:
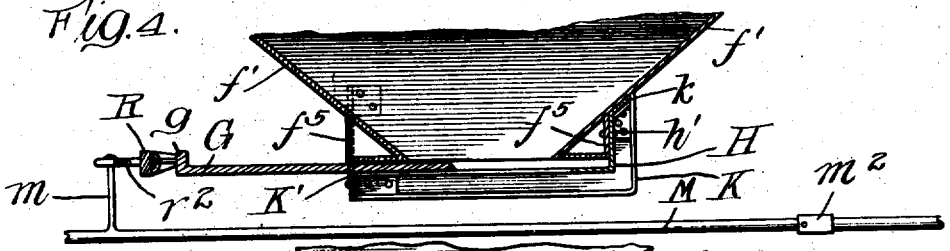
Figure 5:
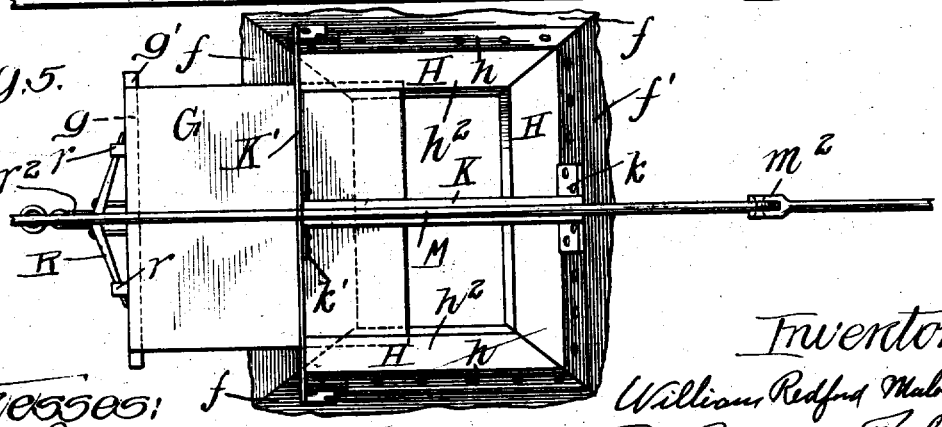
Figure 6:
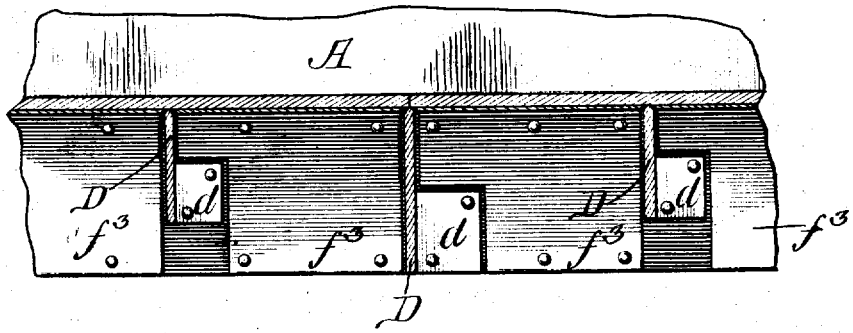
Figure 7:
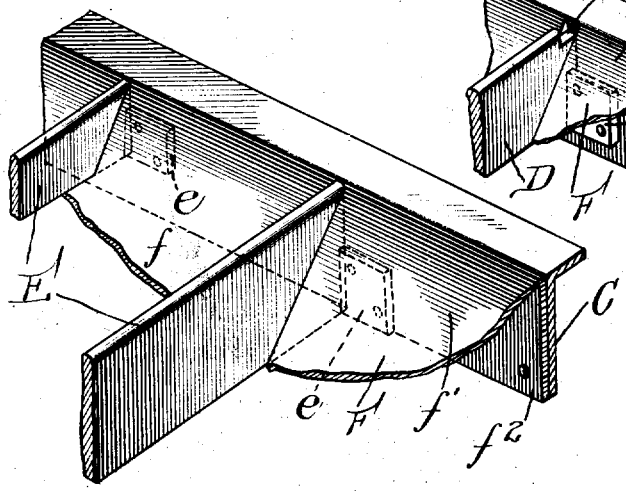
Figure 8:
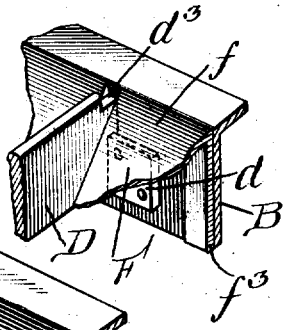
Figure 9:
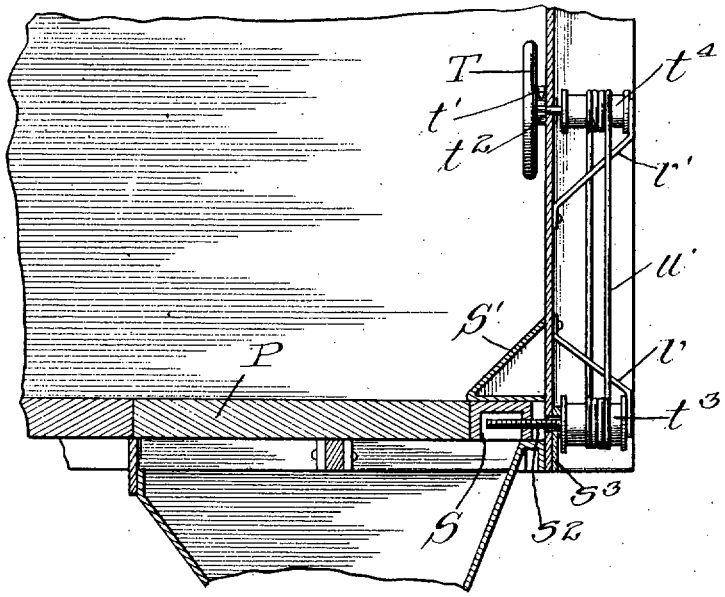
Figure 10:
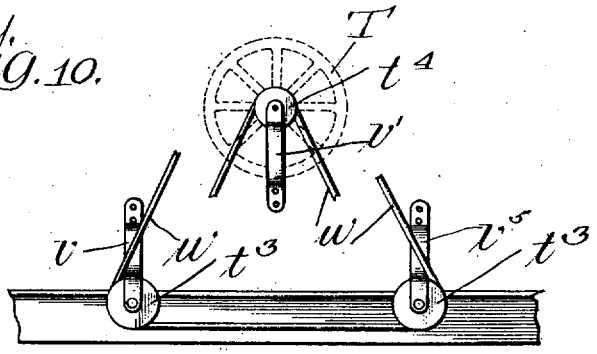
Figure 11:
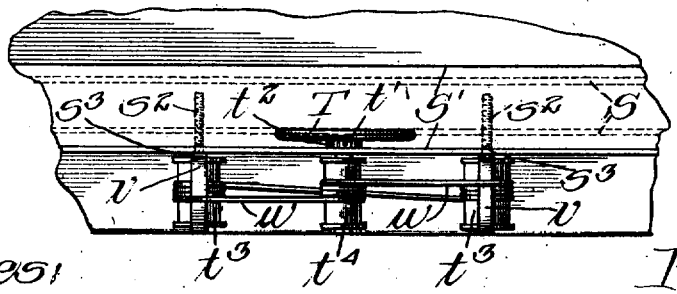

Figure 1 is a plan view of the skeleton floor or network at the bottom of the car-body, the upper portion of the car-body being removed. Fig. 2 is a view in central vertical longitudinal section through a freight-car embodying my invention. Fig. 3 is a view in vertical transverse section through a car embodying my invention. Fig. 4 is a detail longitudinal sectional view, upon an enlarged scale, illustrating the manner of supporting and operating the gates of one of the hoppers. Fig. 5 is an inverted plan view showing the discharge portion of one of the hoppers with its gate partially opened. Fig. 6 is a fractional view in vertical section on line 6 6 of Fig. 3, looking in the direction of the arrow there shown. Fig. 7 is a fractional perspectiv view of a portion of one of the hoppers at the end of the car and the transverse bars passing therethrough. Fig. 8 is a detail perspective view showing the construction of the transverse bars adjacent the doorway of the car. Fig. 9 is a sectional view of a portion of the end of a car, showing a device for holding the floor-sections in place. Fig. 10 is a detail view in elevation of the operating means therefor, and Fig. 11 is a detail plan view of parts shown in Figs. 9 and 10.

In carrying out my invention the side walls and top of the freight-car may be constructed in any suitable manner either of wood or metal. The body of the car is designated as A, and it will be understood that this car will have its side walls provided with the usual or suitable door-openings *a*.

The bottom of the car is preferably formed with side sills B and with end sills C, these side and end sills being preferably of iron or steel angle-bars suitably riveted together at the corners of the car. In the space bounded by the side and end sills B and C is placed the skeleton bottom, that is formed of the transverse bars D and the longitudinal bars E. As shown, the transverse bars D extend from side to side of the car and have their ends formed with angular portions *d*, that are riveted to the vertical faces of the side sills B. Preferably the angular or offset ends *d* of the transverse bars D are cut away at the top, as shown in Fig. 8 of the drawings, so as to permit the sloping side walls *f* of the hoppers F to come substantially flush with the side walls of the car-body. The longitudinal bars E are preferably short bars, having their angular or offset ends *e* riveted to the transverse bars D, as clearly shown in Fig. 1 of the drawings.

The series of hoppers F (preferably formed of rolled-steel plates) extend from end to end of the car, and the end walls *f'* of the extreme front and rear hoppers extend into substantial line with the front and rear end walls of the car, preferably by providing the upper portions of these end walls *f'* with downwardly-turned portions $f^2$, that will be riveted to the end sills C. The hoppers F are of conical shape, the sloping side walls and end walls of each of these hoppers leading to a bottom opening through which the bulk material contained within the hoppers will be discharged by gravitation. The side walls *f* of each of the hoppers F are preferably formed at their upper end with an angular flange $f^3$, that extends downwardly and parallel with the vertical face of the adjacent side sill B, to which it is riveted, as clearly shown in the drawings. Preferably the downwardly-turned flanges $f^3$ of the hopper side walls *f* are cut away where the angular ends *d* of the transverse bars D are riveted to the side sills B, and, as shown, also these side walls $f$ are formed with cut-away spaces to receive such of the transverse bars D as come opposite the central portions of the side walls $f$. The adjacent end walls $f'$ of the hoppers F are preferably riveted, as shown, to the lower portions of the transverse bars D, these end walls $f'$ having flanges that will be suitably riveted to the side walls $f$ of the hoppers. From the construction as thus far described it will be seen that the side walls $f$ of the hoppers and the outer end walls $f'$ of the hoppers at the ends of the car extend substantially to the line of the side and end walls, respectively, of the car-body, and this is a feature of importance, as it avoids any obstruction to the free discharge by gravitation of bulk material—such as grain, ore, and the like—from the body of the car and from the hoppers.

The open lower ends of the hoppers F are provided with suitable gates G, and as it is important that these gates shall close the lower ends of the hoppers in such manner as to guard against any accidental leakage or escape of the bulk material therefrom I prefer to sustain the gates G in the manner next to be described. The side plates $f$ of each of the hoppers F has its lower edge bent to form the angular portion $f^4$, and similarly the lower portion of such of the hopper end plates $f'$ is bent to form the angular portion $f^5$. A support H, formed of plate metal bent to the angular shape shown, is fixed at three sides of the opening of each hopper-bottom, the upper edge of each support H being riveted, as at $h$, to the lower portion of the hopper, while the central portion of each support H is riveted, as at $h'$, to the upturned edge of the angular portions $f^4$ and $f^5$ of the hopper-bottom. Each support H has a flange $h^2$, extending inwardly beneath the opening of each hopper-bottom, this flange $h^2$ being at a sufficient distance from the bottom of the hopper to form a guideway $h^3$ to receive the gate G.

In order to insure against all danger of the sagging of the gates G from the weight of the material within the hoppers, I prefer to extend beneath each hopper a bracket, that consists of the bars K and K'. The bar K has its upturned end secured, as at $k$, to the hopper-bottom, while its horizontal portion extends beneath the opening of the hopper and is united, as at $k'$, to the transverse bar K', and this transverse bar K' has its upturned ends suitably secured to the side walls of the hopper-bottom. Two of the supports H, as shown, are attached to the sides $f$ of the hoppers, while the third support H is attached to one of the end walls $f'$ of the hopper. The upper faces of the flanges of these supports, upon which the gate G rests, are in line with the upper edge of the supporting cross-bar K, so that the gate G may slide properly upon the flanges of the supports H and upon the upper edge of the bar K and be supported thereby.

As indicated in Fig. 4, the support H, that is attached to the end wall $f'$ of the hopper, is set into the angular portion of the bar K, so that the upper face of its flange will be in the same horizontal plane with the upper edge of the horizontal portion of the bar K. By this arrangement it will be seen that when the gate G is slid into position to close the bottom of the hopper three of its edges will be positioned between three sides of the hopper and the horizontal flange on the supports H, so that no leakage of grain can occur at these points. Leakage is also prevented upon the remaining side of the opening, and for this purpose each of the gates G is provided at its outer end with an angular guard-flange $g$, which when the gate is closed shall aid in preventing the escape of grain or like material around the front edge of the gate, and this guard-flange $g$ has its ends $g'$ extended beyond the edge of the gate, so as to completely close the slots or ways in which the sides of the gate move. The gates G may be operated in any suitable manner; but preferably a bar M will extend beneath all of the gates and from end to end of the car, this bar M being united, as by arms $m$, to the outer end of each of the gates, so that when the bar M is shifted in one direction the gates G will be opened to permit the discharge by gravitation of the bulk material from the hoppers, while when the bar M is shifted in the opposite direction the gates will be simultaneously closed. The bar M may be actuated in any convenient manner; but as this forms no part of my present invention I have not deemed it necessary to illustrate or describe any means for actuating this bar.

In order to permit the car to be used for transporting ordinary packages or parcel freight, I provide a removable floor, that is formed of uniform and interchangeable sections P, that extend transversely of the car, the length of each of these sections corresponding to the distance between the side walls of the car-body. The floor-sections P are of such length that any one of these sections will serve to properly extend between the battens or posts $a^2$ of the doorway $a$ of the car-body when the car is to be used for bulk merchandise. In order to enable one of the floor-sections P to more securely close the doorway $a$ of the car-body, I form seats or cut-away spaces $d^3$ (see Fig. 8) in the upper edges of those transverse bars D adjacent to the doorways, and into these seats or spaces $d^3$ will be placed the lower edge of the floor-section P, that is to be used for closing the doorway. It will be understood, of course, that the upper portion of the floor-section P thus used as a doorway may be held against displacement by any desired additional means. When the car is to be used for the transportation of bulk merchandise—such as grain, ore, coal, or the like—the interchangeable floor-sections P, except such as are used for closing the doorways of the car, may be stacked at the ends of the car, as indicated in Fig. 2 of the drawings. When the bulk merchandise is to be discharged, the gates G will be opened, and the grain, ore, coal, or the like will pass by gravitation through the open bottoms of the hopper. When the car is to be used for parcel merchandise, the interchangeable floor-sections P will be laid in position upon the skeleton bottom, and the doorways of the car will then be closed simply by the usual outside sliding doors with which the car-body may be equipped.

By forming the floor of transverse sections substantially equal in length to the distance between the walls of the car-body it will be seen that any desired width may be given to these floor-sections, and this is a marked feature of improvement, particularly in that it enables each of the interchangeable sections to serve as both a standard floor-section and a standard door-section. So, also, by arranging the battens at the sides of the doorway of the car at a distance apart corresponding to the length of the movable floor-sections any one of said floor-sections may be set snugly between the battens, so as to serve as a door and prevent the escape of grain. These and many other advantages incident to my present invention will be readily appreciated by those familiar with railway freight-cars, and it is not deemed necessary to more fully set them forth in this specification.

In order that the flange $g$ of the gate G and the projecting ends thereof shall be properly held against the part $f^5$ and supports H to prevent leakage of grain, the gate G is preferably connected to the operating-rod M through the medium of a yielding spring. A convenient form of such a spring connection is shown in Figs. 4 and 5. The bow-shaped spring R is centrally connected by a bolt $r^2$ to the lug $m$ on the shifting-rod M. The ends of the spring R engage staples $r$ upon the end of the gate, as shown in Fig. 5. Bolts $r'$, fixed to the end of the gate, loosely extend through the spring R, and heads on the outer ends of these bolts engage the outer face of the spring. By thus providing the spring or yielding connection between the gates and the common connecting-rod M all of the gates may be held in innermost position, with the flange $g$ thereof snugly engaging the part $f^5$ of the hopper to prevent leakage. Means are also preferably provided for snugly jamming all of the floor-sections P together to form a solid floor. For this purpose a cross-bar S, which may be conveniently in the form of a channel-bar or of other hollow material construction and which is preferably of the same thickness as the floor, is arranged at one end of the car, as indicated in Figs. 9 and 11. This cross-bar or floor-jamming device is mounted upon a pair of screws $s^2$, that extend through the end of the car and are mounted to rotate in suitable bearings $s^3$. The screws are held against longitudinal movement and are threaded through the cross-bar S. By rotating the screws the cross-bar or floor-jamming device may be moved to bring the sections P of the floor closely into contact. Suitable means may be provided for operating the floor-jamming device, and any suitable means may be provided for operating the screws $s^2$.

In the embodiment of my invention shown the screws $s^2$ are provided at their outer ends with winding-drums $t^3$. A hand-wheel $T^3$, that is shown as located within the body of the car at a distance above the floor, is also provided at its outer end with a winding-drum $t^4$. Around these drums $t^3$ and $t^4$, which are preferably arranged as shown, an endless steel cable is wound, as shown, so that when the hand-wheel $T^3$ is turned in one direction the floor-jamming device S will tighten the floor-sections, while if the hand-wheel be turned in the opposite direction the floor will be loosened. Between the hand-wheel T and the end wall of the car on the shaft of the hand-wheel is fixed a ratchet-wheel $t^2$, that is engaged by a pawl $t'$, pivoted to the car-wall in position to engage the teeth of the ratchet-wheel $t^2$. When the floor-sections are tightened by turning the hand-wheel T, the ratchet-wheel and pawl will hold the floor-sections rigidly together, thus overcoming any loosening effect which might be caused by the movement of the train. Brackets $v\,v'$, secured to the car-wall, serve to hold the several drums in position. A deflector S′, having an inclined face, is preferably arranged above the cross-bar S, so that no grain or other material will lodge thereon.

Preferably, as indicated in Figs. 6, 7, and 8, the upper edges of all parts of the skeleton floor are rounded to prevent lodgment of grain or other material thereon.

The common operating-bar M is preferably provided with broken joints, as indicated at $m^2$, so that it may yield under the strains to which the car is subjected. The floor-sections P may be provided with rings or handles, so that they can be easily and quickly shifted to and from position. The lower ends of the hoppers may, if desired, be connected by brace-bars to strengthen the construction of the car-frame.

It is obvious that numerous changes may be made in the details of structure without departure from the essentials of the invention.

Having thus described my invention, what

I claim as new, and desire to secure by Letters Patent, is—

1. A railway freight-car provided with a skeleton bottom, with a series of hoppers beneath said bottom and with a removable floor formed of interchangeable sections substantially equal in length to the distance between the car-walls.

2. A railway freight-car comprising a skeleton bottom, a flooring formed of removable sections and a plurality of conoidal hoppers located beneath the floor-line of the car, the sloping side walls of said hoppers extending substantially to the side walls of the car-body.

3. A railway freight-car provided with a skeleton bottom, with a floor formed of separate interchangeable sections substantially equal in length to the distance between the car-walls and with a plurality of conoidal hoppers located below the floor-line of the car, said hoppers having their sloping side walls extending substantially to the line of the side walls of the car-body, and the end hoppers having their sloping end walls extending substantially to the end walls of the car-body.

4. A railway freight-car provided with a skeleton bottom formed of narrow, longitudinal and transverse metal bars, a plurality of conoidal hoppers located beneath said skeleton bottom, the sloping walls of adjacent hoppers being secured to transverse bars of the skeleton bottom and the sloping side walls of said hoppers extending substantially to the side walls of the car-body.

5. A railway freight-car having its lower portion formed of side and end sills of angle-bars and having a skeleton bottom comprising longitudinal and transverse bars united to said side and end sills, and having a plurality of conoidal hoppers located beneath said skeleton bottom, the side walls of said hoppers being united to the side sills, and a removable flooring formed of detachable sections adapted to rest upon said skeleton bottom.

6. A railway freight-car having a bottom portion formed of side and end sills and having a skeleton bottom formed of longitudinal and transverse metal bars riveted to said side and end sills, a removable floor formed of detachable sections adapted to rest upon said skeleton bottom, and a plurality of hoppers located entirely beneath said removable floor, the side walls of said hoppers being secured to the side sills of the car-bottom and the end walls of said hopper being secured to the transverse bars of said skeleton bottom.

7. A railway freight-car comprising a skeleton bottom and a floor formed of removable sections adapted to extend transversely of the car and substantially equal in length to the distance between the car-walls, the body of the car being formed with a doorway and with vertical battens at the sides of said doorway, the battens being separated a distance substantially equal to the length of the removable floor-sections, whereby one of said floor-sections will be set between said battens to serve as a door.

8. A railway freight-car comprising a skeleton bottom, a plurality of conoidal hoppers located beneath the floor-line of the car, each of said hoppers being provided at its discharge-opening with a slideway, individual gates for closing the hopper-bottoms, said gates fitting in said slideways, and an operating-rod whereby said gates can be shifted simultaneously.

9. A railway freight-car comprising a skeleton bottom, a plurality of conical hoppers located beneath the floor-line of the car, each of said hoppers being provided at its discharge-opening with a slideway, individual gates for closing the hopper-bottoms, said gates fitting in said slideways, a supporting-bracket extending beneath and across each of said hopper-bottoms, and an operating-rod connected to said several gates.

10. A railway freight-car comprising a skeleton bottom, a plurality of conical hoppers located beneath the floor-line of the car, each of said hoppers being provided at its discharge-opening with a slideway, and sliding gates, said gates fitting in said slideways and being provided with angular flanges at their front ends to close said slideways.

11. A railway freight-car having a plurality of hoppers located beneath the floor-line, each of said hoppers being provided at its discharge-opening with a slideway, individual gates arranged within said slideways, a common operating-rod for said gates and yielding or spring connections between said gates and said operating-rod.

12. A railway freight-car comprising a skeleton bottom, a plurality of hoppers located beneath the floor-line of the car, gates for closing the lower ends of said hoppers, a removable floor comprising a number of sections arranged to be supported upon said skeleton bottom and means for jamming said floor-sections together.

13. A railway freight-car comprising a skeleton bottom, a plurality of hoppers located beneath the floor-line of the car, gates for closing the lower ends of said hoppers, a removable floor comprising a number of sections arranged to be supported upon said skeleton bottom, a movable cross-bar at one end of the car for forcing the floor-sections together, screws for operating said cross-bar and common actuating means for said screws.

14. A railway freight-car comprising a plurality of conical hoppers located beneath the floor-line of the car, each of said hoppers being provided at its discharge-opening with a slideway, and sliding gates, said gates fitting in said slideways and being provided with angular flanges at their front ends to close said slideways.

15. A railway freight-car comprising a conical hopper provided at its bottom with a discharge-opening, three sides in said opening being provided with gate-supports serving also to prevent the escape of bulk material at the sides and one end of the gate and means for preventing the escape of bulk material at the front end of said gate.

16. A railway freight-car comprising a conical hopper provided at its bottom with a discharge-opening a continuous angular depending gate-support extending around three sides of and beneath said discharge-opening and a sliding gate arranged to rest upon said support, said support serving to prevent the escape of bulk material at the sides and one end of the gate, and means for preventing the escape of bulk material at the front end of the gate.

17. A railway freight-car comprising a conical hopper provided at its bottom with a discharge-opening, three sides of said opening having gate-supports that serve to prevent the leakage of bulk material at the sides and one end of a gate and a sliding gate arranged to rest upon said supports and provided at its front with a guard-flange to prevent the escape of bulk material at such point.

18. A railway freight-car comprising a conical hopper provided at its bottom with a discharge-opening, three sides of said opening having gate-supports that serve to prevent the leakage of bulk material at the sides and one end of a gate and a sliding gate arranged to rest upon said supports and provided at its front with a guard-flange and end extensions to prevent the escape of bulk material at such point.

WILLIAM REDFORD MULOCK.

Witnesses:
GEO. P. FISHER, Jr.,
KATHARINE GERLACH.